(12) United States Patent
David

(10) Patent No.: US 10,915,593 B2
(45) Date of Patent: Feb. 9, 2021

(54) WEB PAGE CREATION FROM ENCODED QR CODE DATA

(71) Applicant: Mark Richard David, Sparta, NJ (US)

(72) Inventor: Mark Richard David, Sparta, NJ (US)

(*) Notice: Subject to any disclaimer, the term of this patent is extended or adjusted under 35 U.S.C. 154(b) by 0 days.

(21) Appl. No.: 15/937,437

(22) Filed: Mar. 27, 2018

(65) Prior Publication Data

US 2018/0276306 A1 Sep. 27, 2018

Related U.S. Application Data

(60) Provisional application No. 62/477,067, filed on Mar. 27, 2017.

(51) Int. Cl.
*G06F 17/00* (2019.01)
*G06F 16/955* (2019.01)
*G06K 19/06* (2006.01)
*G06K 7/14* (2006.01)

(52) U.S. Cl.
CPC ........ *G06F 16/955* (2019.01); *G06F 16/9554* (2019.01); *G06F 16/9566* (2019.01); *G06K 7/1417* (2013.01); *G06K 19/06037* (2013.01)

(58) Field of Classification Search
CPC .............. H04L 67/02; G06F 17/30879; G06F 17/30876
USPC ............................................ 235/375, 472.01
See application file for complete search history.

(56) References Cited

U.S. PATENT DOCUMENTS 7,490,134 B2 * 2/2009 Ono .................... G06K 7/10722
235/437

* cited by examiner

*Primary Examiner* — Jamara A Franklin
(74) *Attorney, Agent, or Firm* — Dunlap Bennett & Ludwig, PLLC; Brendan E. Squire

(57) ABSTRACT

A system and method for scanning a unique "license plate" bar code or QR code creates a web page with that unique code as part of the URL. The system allows the end user to tag an asset then scan that asset and automatically create an associated web page.

16 Claims, 1 Drawing Sheet

WEB PAGE CREATION FROM ENCODED QR CODE DATA

CROSS-REFERENCE TO RELATED APPLICATION

This application claims the benefit of priority of U.S. provisional application No. 62/477,067, filed Mar. 27, 2018, the contents of which are herein incorporated by reference.

BACKGROUND OF THE INVENTION

The present invention relates to Quick Response (QR) codes, and more particularly to website interactions from data encoded in a QR code.

Previously QR codes have been generated to bring users back to an existing web page. However, existing QR codes do not provide an application for the user who wants to start with a premade label or a tag for an item and subsequently associate that item to new information entered into the Internet/Cloud. Similarly, existing QR codes do not provide the ability to create a web page from information encoded in the QR code.

As can be seen, there is a need for a system and method for creating a web page from information encoded in a QR code.

SUMMARY OF THE INVENTION

In one aspect of the present invention, a computerized system for creating a web page is disclosed. The computerized system includes a first computer having a user interface. A server is in communication with a database containing one or more unique sets of data characters defining a unique identifier for an item. A program product comprising machine-readable program code for causing, when executed, the computer to perform process steps. The process steps include generating a QR code label encoded with the unique identifier and a programming instruction for creating a web page for the item associated with the unique identifier. Responsive to a scan of the QR code label, the process presents, on the user interface, a template having one or more input data fields for receiving a content associated with the item. Responsive to a user submission of the content, a web page hosted by the server, is automatically create the web page presenting the content associated with the item.

In other embodiments, the steps includes affixing the QR code label to the item. A processed scan of the QR code label may then be received from a second computer and the web page, corresponding to the QR code label is presented on a user interface of the second computer.

In other aspects of the invention, a non-transitory computer-readable memory is adapted to creating a web page for an item based on one or more instructions encoded in a QR code label having a unique identifier associated with the item. The non-transitory computer-readable memory used to direct a computer of to perform process steps. Steps may include responsive to a scan of the QR code label, presenting, on a user interface, a template having one or more input data fields for receiving a content associated with the item. Responsive to a submission of the content, a web page hosted by a server is automatically created, the web page is configured to present the content associated with the item.

In other embodiments, the steps may include receiving a processed scan of the QR code label from a second computer. The unique identifier in the QR code label is associ- ating with the web page. The web page is then presented on a user interface of the second computer.

In yet other aspects of the invention, a method for automatically creating a web page containing information associated with an item, is disclosed. The method includes generating a QR code label encoded with a unique identifier and a programming instruction for creating the web page associated with the item.

Responsive to a scan of the QR code label, the method then presents, on a user interface, a template having one or more input data fields for receiving a content to be associated with the item. Next, responsive to a user submission of the content, the method automatically creates a web page, hosted by a server, the web page presenting the content associated with the item.

In other aspects of the method include, the QR code label is affixed to the item. When a processed scan of the QR code label is received from a second computer, the web page associated with the QR code label is presented on a user interface of the second computer. In each aspect of the invention, a URL for the web page may include the unique identifier.

These and other features, aspects and advantages of the present invention will become better understood with reference to the following drawings, description and claims.

DETAILED DESCRIPTION OF THE INVENTION

Figure 3:
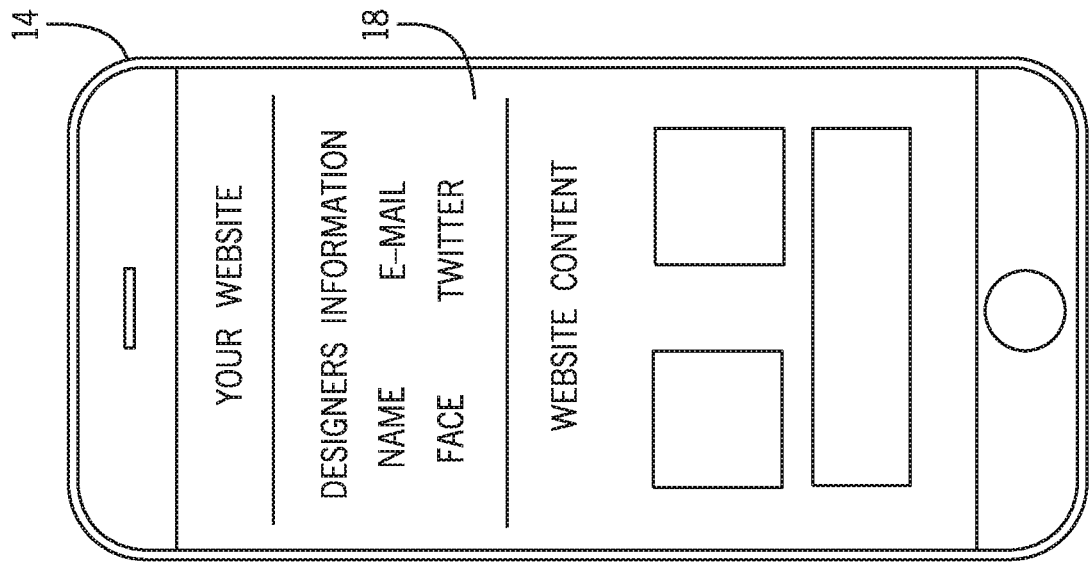
FIG. 3 is the digital device displaying the website automatically created by the invention.
Figure 2:
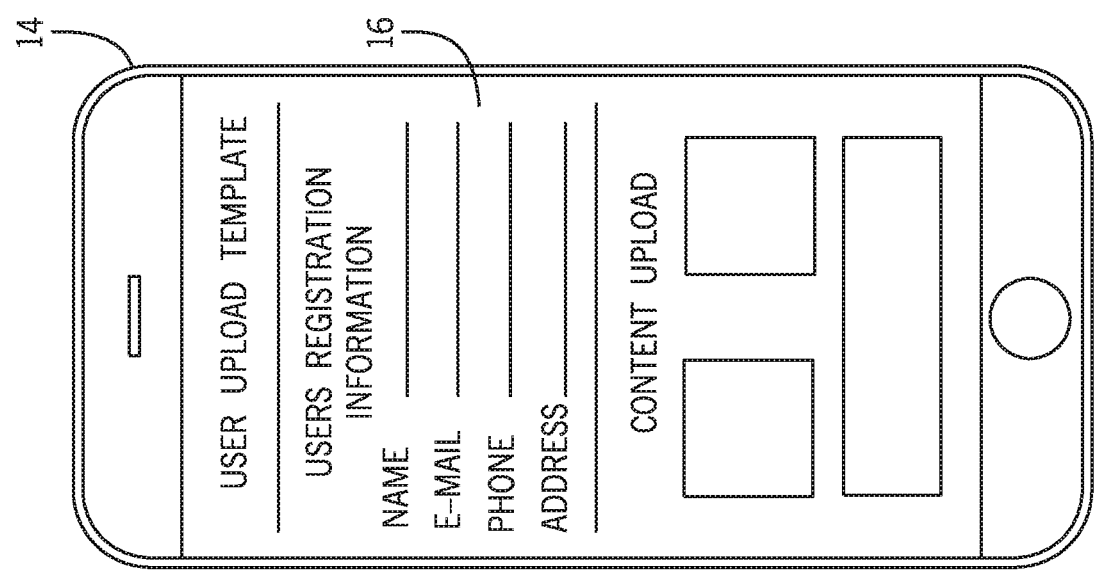
FIG. 2 is a digital computing device displaying a website template according to other aspects of the invention.
Figure 1:
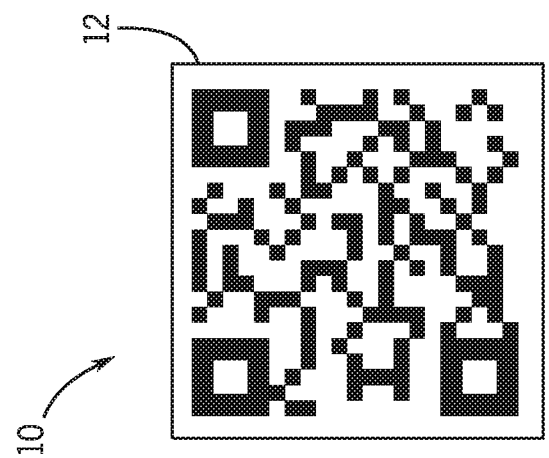
FIG. 1 represents a QR code according to aspects of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system and method for creating a web page from information encoded in a label encoded with computer readable data, such as QR code, or other computer readable code. The system allows the end user to start with a label or tag for any item in the physical world, then scan that label or tag and automatically create an associated web page for the item.

According to aspects of the invention, the user would obtain a unique QR code 10 encoded with unique string of data 12 from a centralized database dedicated to this application. The consumer would scan that code 10 with their smart phone, or other computing device 14, utilizing one or more cameras or imaging devices connected to the computing device 14.

A computer program product processed by the computing device 14 reads the encoded data 12 and generates a new web page 18. The instructions within the QR code 12 present a template 16 on the user interface of the computing device 14. The template 16 may include one or more data fields and design parameters for the webpage 18 content, and populates the site with unique information encoded 12 in and associated with the QR code 10, which the consumer could use for multiple purposes including, but not limited to recording use or care instructions for the item, the item's history or value, etc.

According to a representative process of the invention, the system may include:

1) A database containing one or more unique sets of data characters. The data characters, like license plate numbers, are a unique identifier within the system application.

2) A plurality of Bar code/QR code labels 10 are encoded with the unique identifier (e.g. XYZ123, XYZ1234, XYZ12345) and other encoded data 12 are produced. The encoded data 12 in the QR code 10 also includes web programming code to create and launch a new web page 18 hosted by the server.

3) Scanning the labels 10 communicates the encoded data 12 in the label to the host web site where the encoded data 12 is interpreted, via computer program instructions at the host site to launch a user interface 16 to receive one or more data fields for specifying content to be associated with an item on the new web page 18. and incorporate the encoded data 12 associated with the unique identifier, (e.g. XYZ123).

According to aspects of the invention, multiple new applications are enabled, which may be as varied as consumers creative ideas to tag items and then associate relevant data for others to read on their smart phones 14 or other computing device.

By way of non-limiting example, rather than leaving a handwritten instruction or "notes" for a tool that one person is loaning to another, a QR tag 10 could be attached to the tool. A web page 18 may then be created by the tool owner by scanning the tag 10 where the owner could then enter user specified content 16 or other information pertaining to the tool. The unique content 16 is then transmitted to the server where it is incorporated into a website 18 for the item. The borrower could subsequently scan the tag 10 with their mobile device 14 and receive all the customized instructions pertaining to the tool on a web page 18 displayed on their mobile device 14.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software, which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computerized system for creating a web page, the computerized system comprising:
    a first computer having a user interface;
    a server in communication with a database containing one or more unique sets of data characters defining a unique identifier for an item; and
    a program product comprising machine-readable program code for causing, when executed, the computer to perform the following process steps:
        generating a QR code label encoded with the unique identifier and a programming instruction for creating a web page for the item associated with the unique identifier, and
        hosting the web page by the server after the web page is created for a subsequent retrieval of the web page by a second computer scanning the QR code label.

2. The computerized system of claim 1, further comprising:
    responsive to a scan of the QR code label, presenting, on the user interface of the first computer, a template having one or more input data fields for receiving a content associated with the item.

3. The computerized system of claim 2, further comprising:
    responsive to a user submission of the content, automatically creating the web page hosted by the server, the web page configured to present-the content associated with the item.

4. The computerized system of claim 3, further comprising:
    affixing the QR code label to the item associated with the unique identifier.

5. The computerized system of claim 4, further comprising:
    receiving a processed scan of the QR code label from a second computer;
    retrieving the web page for the item associated with the unique identifier; and
    presenting the web page on a user interface of the second computer.

6. A non-transitory computer-readable memory adapted to create a web page for an item based on one or more instructions encoded in a QR code label with a unique identifier associated with the item, the non-transitory computer-readable memory used to direct a computer to perform the steps of:

responsive to a scan of the QR code label by a first computer, presenting, on a user interface of the first computer, a template having one or more input data fields for receiving a content associated with the item, the content and the one or more instructions configured to instruct a server to create the web page on the server for a subsequent retrieval of the web page by a second computer scanning the QR code label.

7. The non-transitory computer-readable memory of claim 6, further comprising:
receiving an input of the content in the one or more data fields; and
responsive to a submission of the content, automatically creating the web page by server, the web page configured to present the content associated with the item.

8. The non-transitory computer-readable memory of claim 7, further comprising:
receiving a processed scan of the QR code label from a second computer.

9. The non-transitory computer-readable memory of claim 8, further comprising:
associating the unique identifier in the QR code label with the web page; and
transmitting the web page to the second computer.

10. The non-transitory computer-readable memory of claim 8, further comprising:
presenting the web page on a user interface of the second computer.

11. A method for automatically creating a web page containing information associated with an item, comprising:
generating a QR code label encoded with a unique identifier and a programming instruction for creating the web page associated with the item on a server configured to create, then host the web page for a subsequent retrieval of the web page by a second computer scanning the QR code label.

12. The method of claim 11, further comprising:
responsive to a scan of the QR code label, presenting, on a user interface of a first computer, a template having one or more input data fields for receiving a content to be associated with the item on the web page.

13. The method of claim 12, further comprising:
responsive to a user submission of the content, automatically creating the web page as a web page hosted by the server, the web page configured to present the content associated with the item.

14. The method of claim 13, further comprising:
affixing the QR code label to the item.

15. The method of claim 14, further comprising:
receiving a processed scan of the QR code label from a second computer;
transmitting the web page associated with the QR code label to the second computer; and
presenting the web page associated with the QR code label on a user interface of the second computer.

16. The method of claim 15, wherein a URL for the web page includes the unique identifier.

* * * * *